United States Patent
Shi et al.

(10) Patent No.: US 12,025,694 B2
(45) Date of Patent: Jul. 2, 2024

(54) METHOD FOR CALCULATING SENSITIVITY OF DISPLACEMENT OF SAR ALONG LINE-OF-SIGHT DIRECTION TO SLOPE GRADIENT AND SLOPE ASPECT

(71) Applicant: Chengdu University of Technology, Chengdu (CN)

(72) Inventors: Xianlin Shi, Chengdu (CN); Keren Dai, Chengdu (CN); Jin Deng, Chengdu (CN)

(73) Assignee: CHENGDU UNIVERSITY OF TECHNOLOGY, Chengdu (CN)

( * ) Notice: Subject to any disclaimer, the term of this patent is extended or adjusted under 35 U.S.C. 154(b) by 221 days.

(21) Appl. No.: 17/839,929

(22) Filed: Jun. 14, 2022

(65) Prior Publication Data
US 2023/0091343 A1    Mar. 23, 2023

(30) Foreign Application Priority Data
Sep. 16, 2021    (CN) .......................... 202111084210.X

(51) Int. Cl.
*G01S 13/90* (2006.01)
*G01C 5/00* (2006.01)
*G01S 13/88* (2006.01)

(52) U.S. Cl.
CPC .......... *G01S 13/9023* (2013.01); *G01C 5/005* (2013.01); *G01S 13/885* (2013.01); *G01S 13/9017* (2013.01)

(58) Field of Classification Search
CPC ............... G01S 13/9023; G01S 13/885; G01S 13/9017; G01S 13/90; G01S 7/40; G01S 13/86; G01S 13/87; G01S 13/9011; G01S 13/904; G01S 13/9058; G01S 13/9019; G01S 3/7868; G01S 19/258; G01S 13/9088; G01C 5/005; G06F 17/16
See application file for complete search history.

(56) References Cited

U.S. PATENT DOCUMENTS

| | | | |
|---|---|---|---|
| 2003/0081812 A1* | 5/2003 | Yamamoto | G01C 5/005 |
| | | | 382/103 |
| 2010/0091611 A1* | 4/2010 | Laake | G01V 1/30 |
| | | | 702/14 |

FOREIGN PATENT DOCUMENTS

| | | | | |
|---|---|---|---|---|
| CN | 109212522 A | * | 1/2019 | ............. G01S 13/87 |
| CN | 109471104 A | * | 3/2019 | ............. G01S 13/90 |

* cited by examiner

*Primary Examiner* — Bernarr E Gregory
*Assistant Examiner* — Juliana Cross
(74) *Attorney, Agent, or Firm* — Gregory D. DeGrazia; Miller, Canfield, Paddock and Stone

(57) ABSTRACT

A method for calculating a sensitivity of a displacement of Synthetic Aperture Radar (SAR) along line-of-sight direction to a slope gradient and a slope aspect is provided, comprising: obtaining SAR data and Digital Elevation Model (DEM) data covering slope bodies, and extracting a local incident angle of an image by utilizing a satellite side-looking imaging principle; carrying out geometric distortion on the slope bodies under ascending and descending orbits by utilizing the local incident angle, to obtain specific locations of geometric distortion areas under ascending and descending orbit; calculating sensitivities of detections to changes of the slope gradient and the slope aspect under ascending and descending orbits according to the extracted parameter information of the SAR satellite in ascending and descending orbits and satellite heights, and dividing a sensitivity distribution by combining the sensitivity and the specific locations of the geometric distortion.

4 Claims, 4 Drawing Sheets

METHOD FOR CALCULATING SENSITIVITY OF DISPLACEMENT OF SAR ALONG LINE-OF-SIGHT DIRECTION TO SLOPE GRADIENT AND SLOPE ASPECT

CROSS REFERENCE TO RELATED APPLICATION(S)

This patent application claims the benefit and priority of Chinese Patent Application No. 202111084210.X filed on Sep. 16, 2021, and entitled "A METHOD FOR CALCULATING SENSITIVITY OF DISPLACEMENT OF SAR ALONG LINE-OF-SIGHT DIRECTION TO SLOPE GRADIENT AND SLOPE ASPECT", the disclosure of which is incorporated by reference herein in its entirety as part of the present application.

TECHNICAL FIELD

The present disclosure relates to the field of earth observation from space, and in particular, to a method for calculating sensitivity of a displacement of SAR along a line-of-sight direction to a slope gradient and a slope aspect.

BACKGROUND ART

A landslide is one of the most serious natural disasters endangering human survival and development, which has the characteristics of wide distribution, huge scale, complex mechanism and serious harm. Moreover, the landslide not only has great harm itself, but also causes secondary disasters such as debris flows and dammed lake. Thus, landslide is a highly harmful natural disaster. And landslides occur frequently in the mountainous areas such as areas in the Southwest of Sichuan Province, resulting in blocked rivers, blocked roads, buried villages and other huge losses. Landslides in these areas are well known for their frequent occurrence, large scale, complex mechanism, great harm and the like, which are typical and representative all over the world. The conventional geological survey method is limited in identification and monitoring coverage of potential dangers for landslide disasters in alpine areas and is difficult to be implemented in a large scale and in mountainous areas with high efficiency. And the monitoring accuracy of optical remote sensing is limited because of the affection of clouds and fog in mountain areas.

Interferometric Synthetic Aperture Radar (InSAR) technology is a geodetic technology based on earth observation of satellite-borne sensors, which has been developed rapidly in the last 30 years. This technology has the ability of wide-range, high-precision, all-day and all-weather displacement monitoring. With the continuous improvement of temporal and spatial resolution of SAR (synthetic aperture radar) images, the availability of multi-source and multi-temporal SAR images and the continuous development and progress of InSAR time series algorithm, InSAR technology is being widely used in the field of early identification and monitoring of the potential dangers for the geological disasters. This technology can effectively make up the shortcomings of conventional methods. However, in practical application, InSAR can only measure displacement along the line-of-sight (LOS) direction (that is, a measured value of InSAR is a component of earth surface displacement projected to the LOS direction), causing that a result of InSAR displacement monitoring is not equal to real displacement of slope bodies, which results in confusion for geological interpreters and challenge for tasks such as accurate analysis of landslide mass and the like. Therefore, in the early identification of large-scale landslides, a difference between a monitoring result along the LOS direction and a real measurement of displacement of the slope gradient in different slope aspects, and suitability of observing the different slope aspect in ascending and descending orbits, deserve further study. Moreover, it is desired to determine an influence of a change in the slope aspect on InSAR detection of potential landslide in different orbits, and study the applicability of respective detections in ascending and descending orbits to the arbitrary slope gradient and slope aspect in combination with a geometric distortion condition and study a detection on the overall area by combining the ascending-orbit and descending-orbit data, which are of great significance to extract an actual displacement rate of potential landslides and to correctly interpret and determine an InSAR identification result and the like.

SUMMARY

For the above-mentioned shortcomings in the art, the present disclosure provides a method for calculating sensitivity of a displacement of SAR along line-of-sight direction to a slope gradient and a slope aspect, which solves the problem that the displacement derived from SAR in LOS direction are not equal to the real displacement along the actual slope in the prior art.

To achieve the above-mentioned object of the present disclosure, the present disclosure proposes the following technical solution.

A method for calculating a sensitivity of a displacement of SAR along the line-of-sight direction to a slope gradient and a slope aspect, including following steps:

S1: obtaining Synthetic Aperture Radar (SAR) data covering the slope bodies, and extracting parameter information of SAR satellite in ascending orbit, parameter information of SAR satellite in descending orbit and a satellite height from the SAR data by means of radiometric calibration and geocoding;

S2: obtaining Digital Elevation Model (DEM) data covering the slope bodies, and extracting a local incident angle of an image, which is an included angle between an incident direction of the satellite and a normal line of a local slope, by utilizing the DEM data and satellite side-looking imaging principle;

S3: determining geometric distortions of the slope bodies under ascending orbit and under descending orbit respectively, by utilizing the parameter information of the satellite in ascending orbit, the parameter information of the satellite in descending orbit and the local incident angle, to obtain distributions of geometric distortion areas under ascending orbit and under descending orbit respectively;

S4: calculating a detection sensitivity to changes of the slope gradient and the slope aspect under ascending orbit according to the extracted parameter information of the SAR satellite in ascending orbit and the satellite height, and meantime, calculating a detection sensitivity to changes of the slope gradient and the slope aspect under descending orbit according to the extracted parameter information of the satellite in descending orbit and the satellite height; and S5: constructing an initial sensitivity distribution map according to the sensitivity calculated under ascending orbit and the sensitivity calculated under descending orbit in step S4, removing those slope bodies which have geometric distortions of layover and shadow from the initial sensitivity distribution map in combination with the distributions of geometric distortion areas, to obtain a corrected sensitivity distribution map, which is sensitivity of SAR displacement along the line-of-sight direction to the slope gradient and the slope aspect.

Further, the parameter information in step S1 includes an incident slant range, an included angle between a flight direction and the true north direction, and an satellite incident angle, where the satellite incident angle is an included angle between line-of-sight of the satellite and a vertical direction; the satellite height includes a height of the satellite from a center of earth, and a height of the satellite from a bottom of each slope body.

Further, the extracting the local incident angle of the image in step S2 includes:

obtaining a local incident angle $\alpha_i$ of pixels in an i-th column of the image according to following equation:

$$\alpha_i = \arccos\left(\frac{R_H - R_h}{i * p_r + L}\right)$$

where, arccos is an inverse cosine function, $R_H$ is the height of the satellite from the center of the earth, $R_H$ is the height of the satellite from the bottom of the slope body, $P_r$ is a slant range resolution, L is an incident slant range, and * is a multiplication sign.

Further, process of determining geometric distortions of the slope body under ascending orbit and under descending orbit, by utilizing the parameter information of the satellite ascending orbit, the parameter information of the satellite descending orbit and the local incident angle in step S3 includes:

S3-1: determining whether the local incident angle is less than 0 degree; if the local incident angle is less than 0 degree, determining the slope body to be a slope body with the geometric distortions of layover, and ending the process of determining geometric distortions; otherwise, proceeding to step S3-2;

S3-2: determining whether the local incident angle is greater than or equal to 0 degree and less than or equal to 90 degrees; if the local incident angle is determined to be greater than or equal to 0 degree and less than or equal to 90 degrees, then proceeding to step 3-3; if the local incident angle is not greater than or equal to 0 degree or not less than or equal to 90 degrees, determining the slope body to be a slope body with the geometric distortions of shadow, and ending the process of determining geometric distortion; and S3-3: determining whether the local incident angle is less than the satellite incident angle; if the local incident angle is less than the satellite incident angle, then determining the slope body to be a slope body with the geometric distortions of foreshortening; otherwise, determining the slope body to be a suitable slope body.

Further, the calculating the sensitivity under ascending orbit and the sensitivity under descending orbit in step S4 includes:

S4-1: establishing a space rectangular coordinate system, by assuming a direction of the satellite perpendicular to the slope body to be a Z axis, and an intersection of the Z axis and the bottom of the slope body to be an origin, and determining the true north direction and a true east direction;

S4-2: obtaining a unit vector along the line-of-sight direction of the satellite according to following equation:

$$\vec{u} = \begin{bmatrix} \vec{u}_E \\ \vec{u}_N \\ \vec{u}_Z \end{bmatrix} = \begin{bmatrix} \cos\alpha_s \sin\alpha \\ \sin\alpha_s \sin\alpha \\ -\cos\alpha \end{bmatrix}$$

where $\vec{u}_E$ is a component vector of the unit vector in the true east direction, $\vec{u}_N$ is a component vector of the unit vector in the true north direction, $\vec{u}_Z$ is a component vector of the unit vector in the Z axis direction, cos is a cosine function, sin is a sine function, $\alpha_s$ is an included angle between a flight direction of the satellite and the true north direction, and $\alpha$ is an satellite incident angle.

In step S4-3, the slope aspect and the slope gradient of the slope body are obtained, and a unit vector $\vec{\gamma}$ of a maximum gradient on the slope body is obtained according to the following equation:

$$\vec{\gamma} = \begin{bmatrix} \vec{\gamma}_E \\ \vec{\gamma}_N \\ \vec{\gamma}_Z \end{bmatrix} = \begin{bmatrix} \sin\alpha_{slope}\cos\varphi \\ \cos\alpha_{slope}\cos\varphi \\ -\sin\varphi \end{bmatrix}$$

where, $\vec{\gamma}_E$ is a component vector of the maximum gradient on the slope body, along the true east direction; $\vec{\gamma}_N$ is a component vector of the maximum gradient on the slope body, along the true north direction; $\vec{\gamma}_Z$ is a component vector of the maximum gradient on the slope body, along the Z axis direction; $\alpha_{slope}$ is a slope aspect angle; and $\varphi$ is a slope gradient angle.

In step S4-4, the sensitivity $\cos \beta$ is calculated according to the following equation:

$$\cos\beta = \frac{\vec{\gamma}\vec{u}}{|\vec{\gamma}||\vec{u}|} = \vec{\gamma}\cdot\vec{u} = \cos\alpha_s\sin\theta\sin\alpha_{slope}\cos\varphi + \sin\alpha_s\sin\theta\cos\alpha_{slope}\cos\varphi + \cos\theta\sin\varphi$$

The present disclosure has the beneficial effects of: in the application of identifying potential landslides in large-range alpine and canyon areas, being capable of determining sensitivity of InSAR detection in different orbits to different slope aspects; being adapted to perform detection under ascending and descending orbits respectively when the slope gradient and slope aspect change; and obtaining a reliable detection condition of the overall area by combining geometric distortion and data under ascending and descending orbits, thereby making it possible to realize accurate calculation of a displacement rate of an actual sliding of an identified potential landslides and to realize correct understanding, interpretation and judgment on a measured value along the SAR line-of-sight direction and a real sliding displacement amount along a slope surface. The present disclosure considers slight changes of the satellite incident angle along the slant range direction in a satellite image to calculate influences of different slope gradients and slope aspects on SAR measurement sensitivity, and meanwhile considers influences caused by geometric distortion.

DETAILED DESCRIPTION OF THE EMBODIMENTS

Specific embodiments of the present disclosure are described below to make it convenient for those skilled in the art to understand the present disclosure, but it should be clear that the present disclosure is not limited to the scope of the specific embodiments. For those ordinarily skilled in the art, as long as various changes are within the spirit and scope of the present disclosure defined and determined by the appended claims, these changes are apparent, and all inventions that utilize the concept of the present disclosure are under protection.

Figure 1:
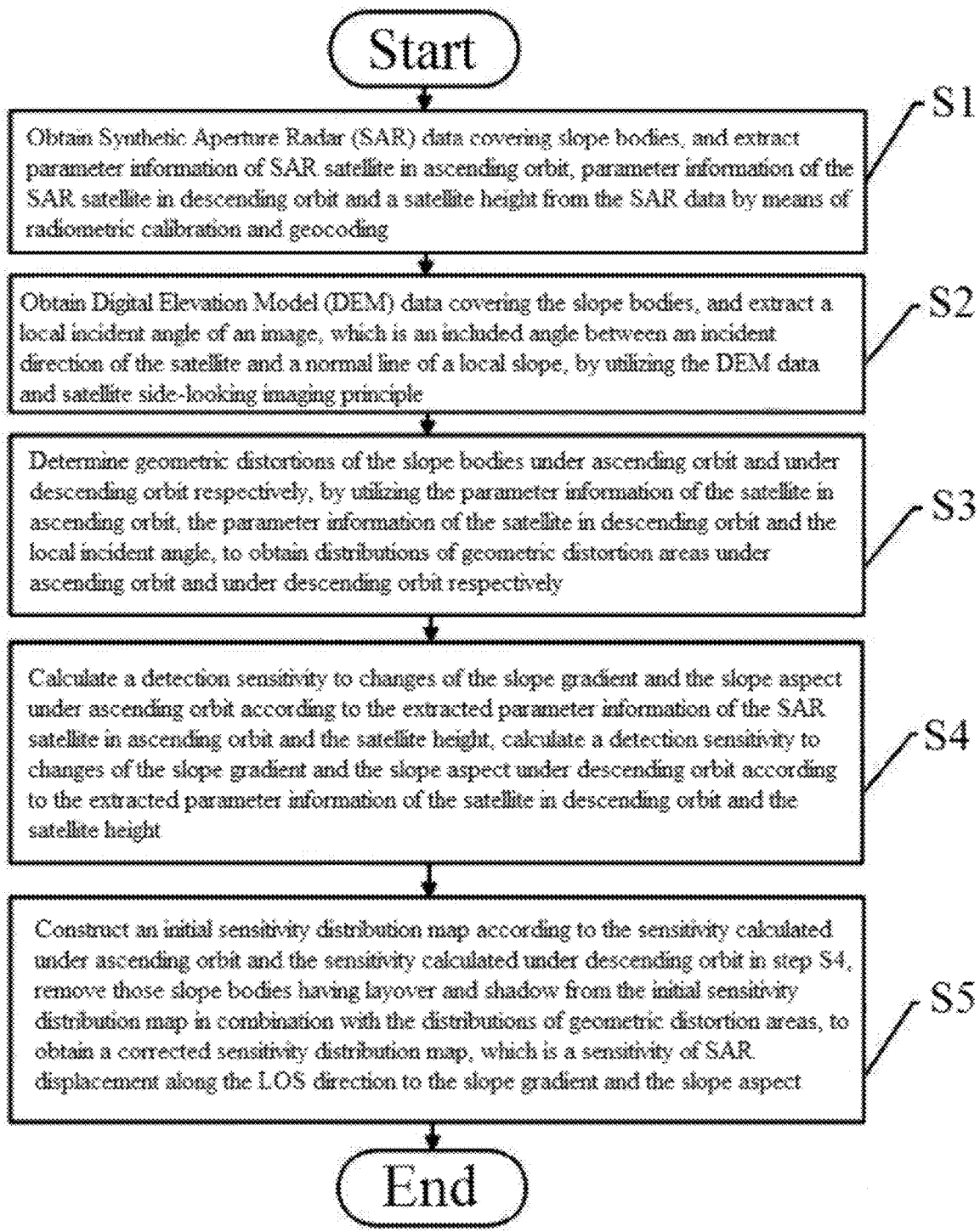
FIG. 1 is a flowchart of the present disclosure.

As shown in FIG. 1, a method for calculating sensitivity of a displacement of SAR along the line-of-sight direction to a slope gradient and a slope aspect includes the following steps S1 to S5.

In step S1, Synthetic Aperture Radar (SAR) data covering slope bodies is obtained, and parameter information of the SAR satellite in ascending orbit, parameter information of the SAR satellite in descending orbit and a satellite height are extracted from the SAR data by means of radiometric calibration and geocoding.

In step S2, Digital Elevation Model (DEM) data covering the slope bodies is obtained, and a local incident angle of an image, i.e., an included angle between an incident direction of the satellite and the normal direction of local slope, is extracted by utilizing the DEM data and satellite side-looking imaging principle.

In step S3, geometric distortions of the slope bodies under ascending orbit and descending orbit are determined by utilizing the parameter information of the satellite in ascending orbit, the parameter information of the satellite in descending orbit and the local incident angle, to obtain distributions of geometric distortion areas under ascending orbit and descending orbit respectively.

In step S4, a sensitivity of detection under ascending orbit when the slope gradient and the slope aspect change is calculated according to the collected parameter information of the SAR satellite in ascending orbit and the satellite height, and meanwhile, a sensitivity of detection under descending orbit when the slope gradient and the slope aspect change is calculated according to the collected parameter information of the satellite in descending orbit and the satellite height.

In step S5, an initial sensitivity distribution map is constructed according to the sensitivities obtained in step S4. In combination with the distribution of geometric distortion areas, those slope bodies with layovers and shadow are excluded from the initial sensitivity distribution map, to obtain a corrected sensitivity distribution map, i.e., to obtain sensitivity of displacement of SAR along the line-of-sight direction to a slope gradient and a slope aspect.

The parameter information in step S1 includes an incident slant range, an included angle between a flight direction and the true north direction, and a satellite incident angle, where the satellite incident angle is an included angle between the line-of-sight of the satellite and a vertical direction; the satellite height includes a height of the satellite from a center of the earth, and a height of the satellite from the bottom of each slope body.

Figure 2:
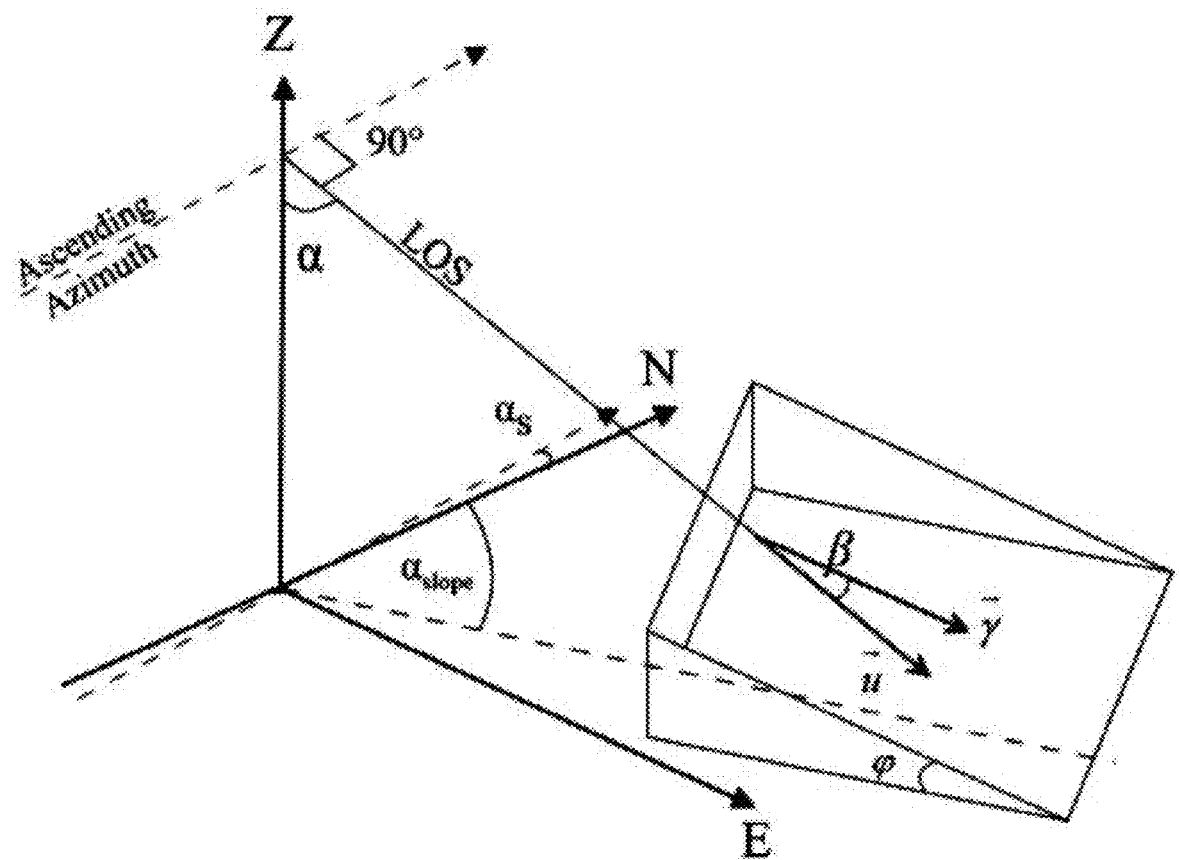
FIG. 2 is a geometric relation diagram of a satellite incident angle in ascending orbit and a maximum slope aspect vector with a given slope.

In an embodiment of the present disclosure, as shown in FIG. 2. Ascending Azimuth is a flight azimuth line, Z axis in the space rectangular coordinate system is perpendicular to the bottom of the slope body, N axis in the space rectangular coordinate system points to the true north direction, E axis in the space rectangular coordinate system points to the true east direction, $\alpha$ is a satellite incident angle, $\alpha_s$ is an included angle between a flight direction and the true north direction, $\beta$ is an angle corresponding to sensitivity, $\vec{u}$ is a unit vector along the line-of-sight direction of the satellite, $\vec{\gamma}$ is a unit vector of a maximum slope of a slope body, $\alpha_{slope}$ is a slope aspect angle, i.e., an included angle between the N axis (solid line) and the slope aspect (dotted line), and $\varphi$ is a slope gradient angle.

The extracted flight azimuth angles and satellite incident angles under ascending and descending orbit are shown in Table 1, where the flight azimuth angle is an included angle between a flight direction and the true north direction, the line-of-sight incident angle is an incident angle along the LOS direction, Sentinel-1 denotes a type of a satellite used in the present disclosure, and an imaging mode of the satellite is Terrain Observation by Progressive Scans (TOPS).

TABLE 1

Table of Flight Azimuth Angle and Satellite Incident Angle Parameters of Images Captured by Sentinel-1 Ascending and Descending Orbit

| Sentinel-1 parameters | Description | |
|---|---|---|
| Orbit direction | Ascending orbit | Descending orbit |
| Flight azimuth ($\alpha_s$)/$^\alpha$ | −12.77 | −167.25 |
| Satellite incident angle ($\alpha$)/$^\alpha$ | 41.69 | 39.53 |

Now, a specific method for extracting the local incident angle of the image in step S2 is described.

A local incident angle $\alpha_i$ of pixels in an i-th column of the image is obtained according to the following equation:

$$\alpha_i = \arccos\left(\frac{R_H - R_h}{i * p_r + L}\right)$$

where, arccos is an inverse cosine function, $R_H$ is the height of the satellite from the center of the earth, $R_h$ is the height of the satellite from the bottom of the slope body, $P_r$ is slant range resolution, L is an incident slant range, and * is a multiplication sign.

A difference between satellite incident angles of adjacent pixels is calculated according to the above equation, and a relationship between a change rate of the satellite incident angle and pixel column along corresponding imaging slant range direction in the image is analyzed. From the relationship, it can be seen that once a pixel is added near the incident slant range, the satellite incident angle will increase by about $3\times10^{-4}$ degrees, and once a pixel is added far from the incident slant range, the satellite incident angle will increase by about $1.6\times10^{-4}$ degrees. As the slant range increases, the change rate of the satellite incident angle decreases gradually, and the change rate of the satellite incident angle does not change linearly in the slant range direction. Therefore, by determining a relationship between the satellite incident angle and the local incident angle, methods for determining whether the geometric distortion occurs can be established.

Now, a specific method for determining geometric distortions of the slope body under ascending orbit and descending orbit by utilizing the parameter information of the satellite in ascending orbit and the parameter information of the satellite in descending orbit, and the local incident angle in step S3 is described.

In step S3-1, it is determined whether the local incident angle is less than 0 degree, and if so, the slope body is determined to be the geometric distortions of layover, and the process of determining geometric distortions is ended; otherwise, the process proceeds to step S3-2.

In step S3-2, it is determined whether the local incident angle is greater than or equal to 0 degree and less than or equal to 90 degrees, and if so, the process proceeds to step 3-3; otherwise, the slope body is determined to be the geometric distortions of shadow, and the process of determining geometric distortions is ended.

In step S3-3, it is determined whether the local incident angle is less than the satellite incident angle, and if so, the slope body is determined to be the geometric distortions of foreshortening; otherwise, the slope body is determined to be a suitable slope body.

Now, the method for calculating the sensitivity in step S4 is described.

In step S4-1, a space rectangular coordinate system is established by assuming a direction of the satellite perpendicular to the slope body to be a Z axis and an intersection of the Z axis and the bottom of the slope body to be an origin, determining the true north direction and the true east direction.

In step S4-2, a unit vector $\vec{u}$ along the line-of-sight direction of the satellite is obtained according to the following equation:

$$\vec{u} = \begin{bmatrix} \vec{u}_E \\ \vec{u}_N \\ \vec{u}_Z \end{bmatrix} = \begin{bmatrix} \cos\alpha_s \sin\alpha \\ \sin\alpha_s \sin\alpha \\ -\cos\alpha \end{bmatrix}$$

where, $\vec{u}_E$ is a component vector of the unit vector in the true east direction, $\vec{u}_N$ is a component vector of the unit vector in the true north direction, $\vec{u}_Z$ is a component vector of the unit vector in the Z axis direction, cos is a cosine function, sin is a sine function, $\alpha_s$ is an included angle between a flight direction of the satellite and the true north direction, and $\alpha$ is an satellite incident angle.

In step S4-3, the slope aspect and the slope gradient of the slope body are obtained, and a unit vector $\vec{\gamma}$ of a maximum gradient on the slope body is obtained according to the following equation:

$$\vec{\gamma} = \begin{bmatrix} \vec{\gamma}_E \\ \vec{\gamma}_N \\ \vec{\gamma}_Z \end{bmatrix} = \begin{bmatrix} \sin\alpha_{slope}\cos\varphi \\ \cos\alpha_{slope}\cos\varphi \\ -\sin\varphi \end{bmatrix}$$

where, $\vec{\gamma}_E$ is a component vector of the maximum gradient on the slope body, along the true east direction; $\vec{\gamma}_N$ is a component vector of the maximum gradient on the slope body, along the true north direction; $\vec{\gamma}_Z$ is a component vector of the maximum gradient on the slope body, along the Z axis direction; $\alpha_{slope}$ is a slope aspect angle; and $\varphi$ is a slope gradient angle.

In step S4-4, the sensitivity $\cos\beta$ is calculated according to the following equation:

$$\cos\beta =$$

$$\frac{\vec{\gamma}\vec{u}}{|\vec{\gamma}||\vec{u}|} = \vec{\gamma}\cdot\vec{u} = \cos\alpha_s\sin\theta\sin\alpha_{slope}\cos\varphi + \sin\alpha_s\sin\theta\cos\alpha_{slope}\cos\varphi + \cos\theta\sin\varphi$$

Figure 3:
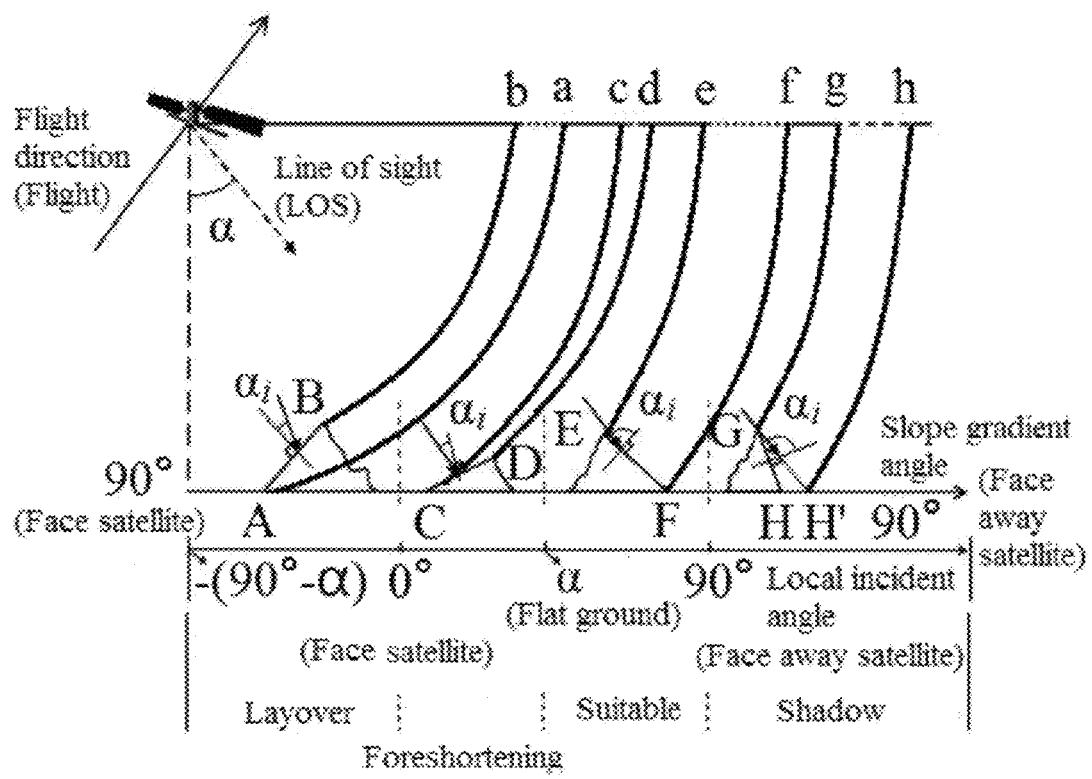
FIG. 3 is a schematic diagram of a geometric distortion relationship in radar side-looking imaging.
Figure 4:
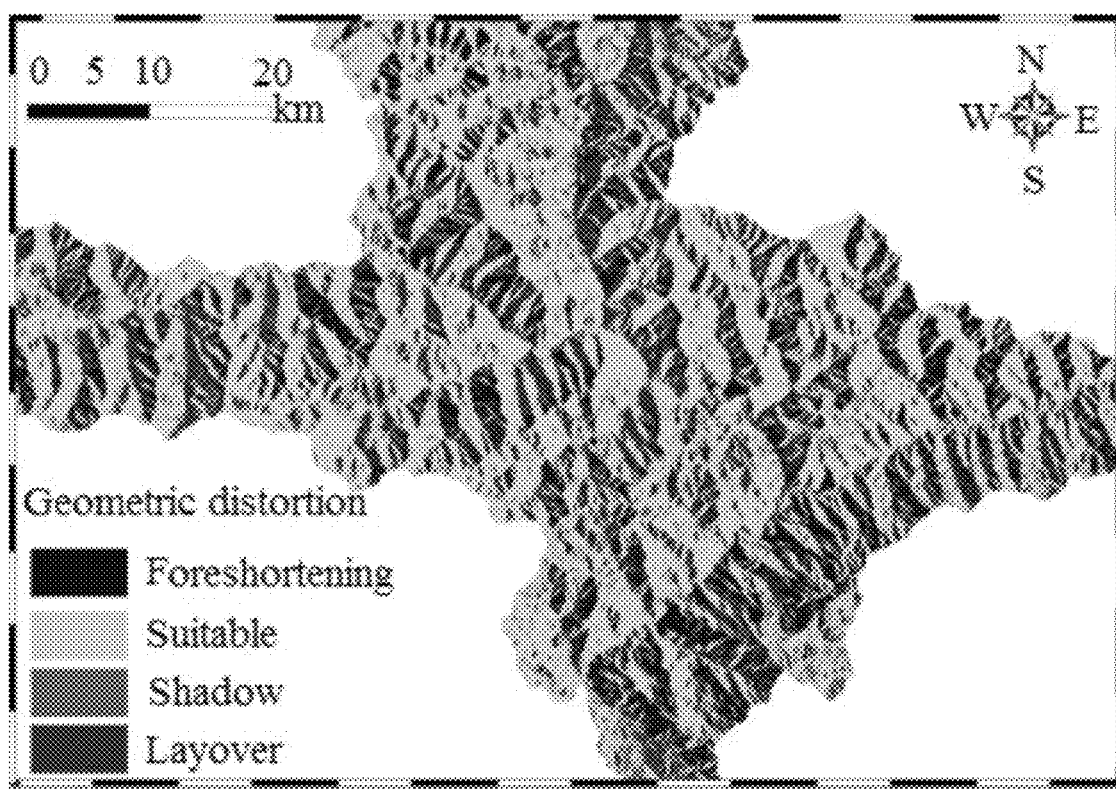
FIG. 4 is a diagram of geometric distortion of slope bodies when satellite in ascending orbit.
Figure 5:
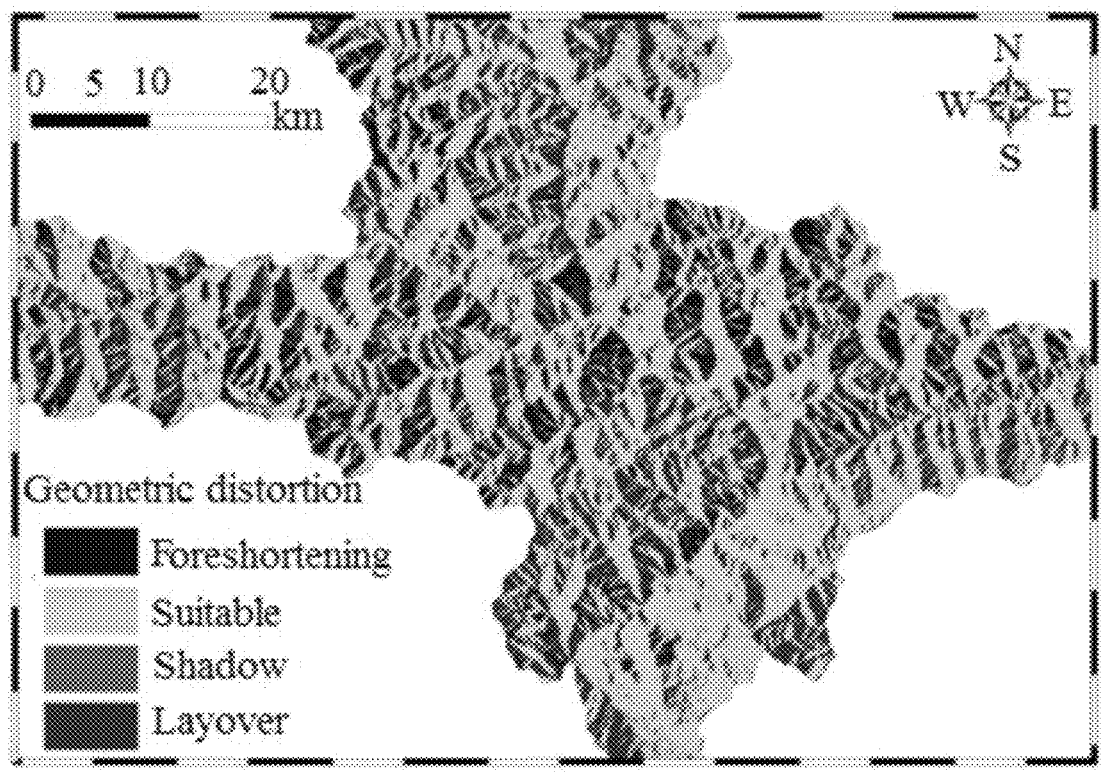
FIG. 5 is a diagram of geometric distortion of the slope bodies when satellite in descending orbit.

As shown in FIG. 3, when the slope surface faces (for example, the ab surface as shown in FIG. 3) the satellite and the slope gradient is steep, the top of the mountain will be imaged before the ground, and an inversion of the top and bottom, i.e., layover phenomenon, will occur in the SAR image. In this case, the local incident angle $\alpha_i$ is negative. As the slope gradient become gradual, the layover phenomenon will disappear (for example, the cd surface as shown in FIG. 3), but an imaging distance will be less than an actual distance, resulting in a foreshortening phenomenon. In this case, the local incident angle $\alpha_i$ is less than the satellite incident angle $\alpha$. For $\alpha=\alpha_i$, namely an actual flat ground, the image is normal without geometric distortion. When the slope surface faces away the satellite and the slope gradient is gentle (for example, the ef surface in FIG. 3), the image is normal and is in a relatively best observation state (i.e., a suitable state, in which the image has high imaging resolution without geometric distortion). In this case, the satellite incident angle $\alpha$ is greater than the local incident angle $\alpha_i$ and less than 90 degrees, which is suitable for SAR observation in the current orbit. In FIG. 4, when the satellite incident angle $\alpha$ is greater than 90 degrees, the satellite will fail to illuminate the slope body (for example, the surface gh as shown in FIG. 3), shadows are produced, and imaging and measurement cannot be performed. InSAR can only measure displacement along the line-of-sight direction. That is, a rate value measured by InSAR represents a component of earth surface displacement projected along the LOS direction. Therefore, according to a sensitivity calculation equation obtained by analyzing the three-component unit vectors in the LOS direction and the maximum slope gradient direction, the sensitivity of respective detection under ascending and descending orbits when the slope gradient and the slope aspect change is calculated. And distributions of geometric distortion under ascending and descending orbits are as shown in FIGS. 4 and 5.

Figure 6:
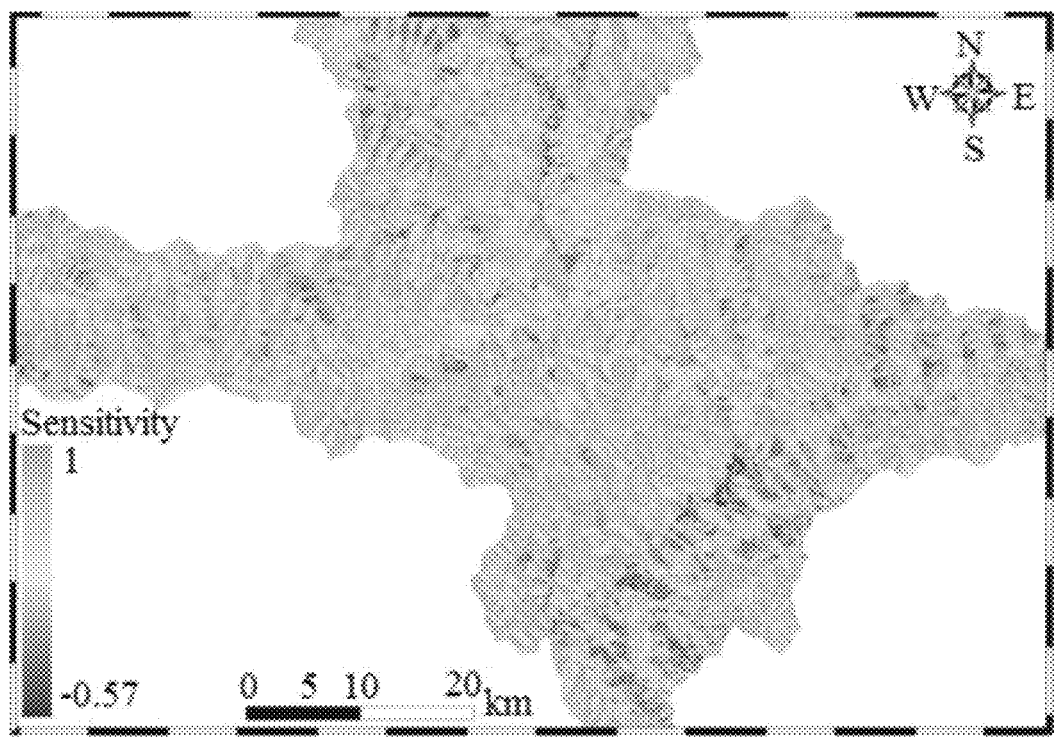
FIG. 6 is a distribution diagram of sensitivity of the slope bodies when satellite in ascending orbit.
Figure 7:
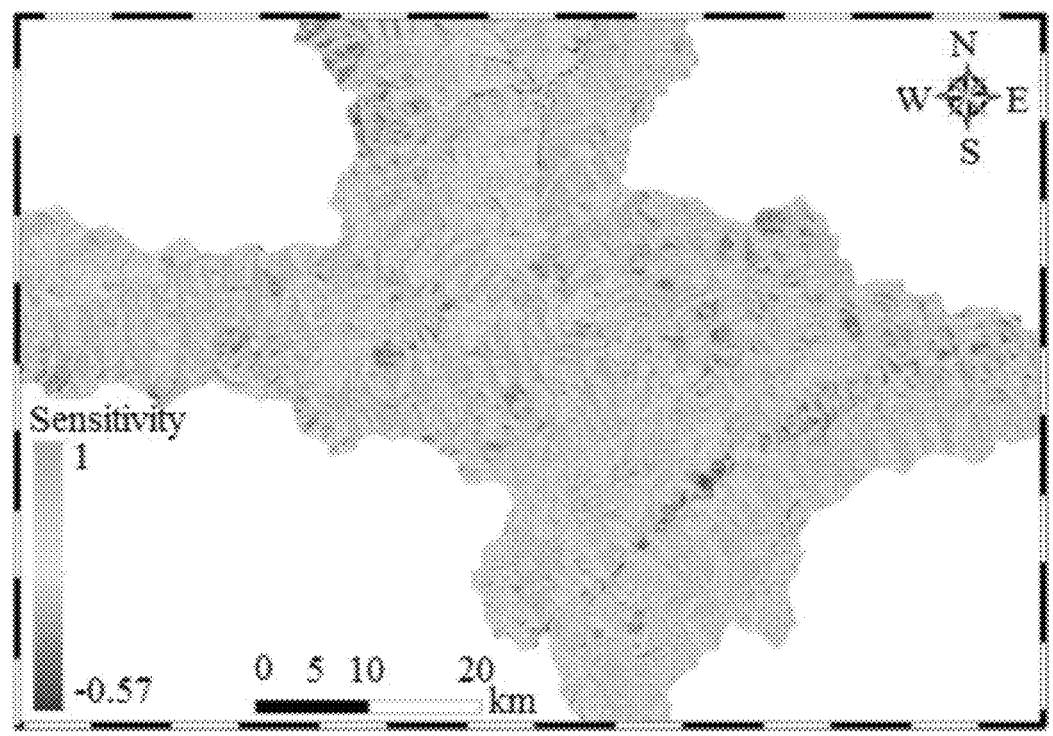
FIG. 7 is a distribution diagram of sensitivity of the slope bodies when satellite in descending orbit.

As shown in FIGS. 6 and 7, the sensitivity represents a size of displacement that can be measured along the LOS direction of the satellite when the slope body deforms by one unit. It can be seen that the sensitivity is highly correlated to the slope gradient and the slope aspect. The sensitivity of the slope body along the LOS direction is relatively consistent. The sensitivity of the slope body facing to the east is high in ascending orbit, and the sensitivity of the slope body facing the west is high in descending orbit.

The present disclosure is capable of determining sensitivity of InSAR detection in different orbits to different slope aspects, in identification of potential landslides in large-range alpine and canyon areas and can be adapted to perform detection under ascending and descending orbits when the slope gradient and slope aspect change. That is, this disclosure is suitable for observation of SAR data under ascending and descending orbits, and is capable of exactly observing an area with high applicability, and low precision in observation results or cannot observe an area with low applicability which corresponds to an area with geometric distortion (i.e., layovers, shadows and the like). Further, the present disclosure obtains a reliable detection condition of the overall area by combining geometric distortion and data of ascending and descending orbits, thereby making it possible to calculate accurately a displacement rate of an actual sliding of the identified potential landslides and to realize correct understanding and interpretation judgement on a measured value along the SAR line-of-sight direction and a real sliding displacement amount along a slope surface. This present disclosure considers slight changes in the satellite incident angle along the slant range direction in a satellite image to calculate influences of different slope gradients and slope aspects on sensitivity of SAR measurement, and meanwhile considers influences caused by geometric distortion.

What is claimed is:

1. A method for calculating a sensitivity of a displacement of SAR along a line-of-sight (LOS) direction to a slope gradient and a slope aspect, comprising:
   S1: obtaining Synthetic Aperture Radar (SAR) data covering slope bodies, and extracting parameter information of SAR satellite in ascending orbit, parameter information of the SAR satellite in descending orbit and satellite height from the SAR data by means of radiometric calibration and geocoding;
   S2: obtaining Digital Elevation Model (DEM) data covering the slope bodies, and extracting a local incident angle of an image, which is an included angle between an incident direction of the satellite and a normal line of a local slope, by utilizing the DEM data and satellite side-looking imaging principle;
   S3: determining geometric distortions of the slope bodies under ascending orbit and under descending orbit respectively, by utilizing the parameter information of the satellite in ascending orbit, the parameter information of the satellite in descending orbit and the local incident angle, to obtain distributions of geometric distortion areas under ascending orbit and under descending orbit, respectively;
   S4: calculating a detection sensitivity to changes of the slope gradient and the slope aspect under ascending orbit according to the extracted parameter information of the SAR satellite in ascending orbit and the satellite height, calculating a detection sensitivity to changes of the slope gradient and the slope aspect under descending orbit according to the extracted parameter information of the satellite in descending orbit and the satellite height; and
   S5: constructing an initial sensitivity distribution map according to the sensitivity calculated under ascending orbit and the sensitivity calculated under descending orbit in step S4, removing those slope bodies having layover and shadow from the initial sensitivity distribution map in combination with the distributions of geometric distortion areas, to obtain a corrected sensitivity distribution map, which is a sensitivity of SAR displacement along the LOS direction to the slope gradient and the slope aspect;
   wherein the calculating the sensitivity in step S4 comprising:
   S4-1: establishing a space rectangular coordinate system by assuming a direction of the satellite perpendicular to each slope body to be a Z axis and an intersection of the Z axis and bottom of the slope body to be an origin, and determining the true north direction and a true east direction;
   S4-2: obtaining a unit vector $\vec{u}$ along the LOS direction of the satellite according to following equation:

$$\vec{u} = \begin{bmatrix} \vec{u}_E \\ \vec{u}_N \\ \vec{u}_Z \end{bmatrix} = \begin{bmatrix} \cos\alpha_s \sin\alpha \\ \sin\alpha_s \sin\alpha \\ -\cos\alpha \end{bmatrix}$$

wherein, $\vec{u}_E$ is a component vector of the unit vector along the true east direction, $\vec{u}_N$ is a component vector of the unit vector in the true north direction, $\vec{u}_Z$ is a component vector of the unit vector in the Z axis direction, cos is a cosine function, sin is a sine function, $\alpha_s$ is an included angle between a flight direction of the satellite and the true north direction and $\alpha$ is the satellite incident angle:
   S4-3: obtaining the slope gradient and the stone aspect of the slope body and obtaining a unit vector $\vec{\gamma}$ of a maximum gradient on the slope body according to following equation:

$$\vec{\gamma} = \begin{bmatrix} \vec{\gamma}_E \\ \vec{\gamma}_N \\ \vec{\gamma}_Z \end{bmatrix} = \begin{bmatrix} \sin\alpha_{slope}\cos\varphi \\ \cos\alpha_{slope}\cos\varphi \\ -\sin\varphi \end{bmatrix}$$

wherein, $\vec{\gamma}_E$ is a component vector of the maximum gradient on the slope body in the true east direction, $\vec{\gamma}_N$ is a component vector of the maximum gradient on the slope body in the true north direction, $\vec{\gamma}_Z$ is a component vector of the maximum gradient on the slope body in the Z axis direction, $\alpha_{slope}$ is a slope aspect angle, and $\varphi$ is a slope gradient angle; and
   S4-4: calculating the sensitivity cos β according to following equation:

$$\cos\beta = \frac{\vec{\gamma}\vec{u}}{|\vec{\gamma}||\vec{u}|} = \vec{\gamma}\cdot\vec{u} = \cos\alpha_s\sin\theta\sin\alpha_{slope}\cos\varphi + \sin\alpha_s\sin\theta\cos\alpha_{slope}\cos\varphi + \cos\theta\sin\varphi$$

2. The method according to claim 1, wherein the parameter information in step S1 comprises an incident slant range, an included angle between a flight direction and the true north direction, and the satellite incident angle; wherein the satellite incident angle is an included angle between a line-of-sight of the satellite and a vertical direction; the satellite height comprises a height of the satellite from a center of the earth, and a height of the satellite from the bottom of each slope body.

3. The method according to claim 1, wherein the extracting the local incident angle of the image in step S2 comprises:

obtaining a local incident angle $\alpha_i$ of pixels in an i-th column of the image according to following equation:

$$\alpha_i = \arccos\left(\frac{R_H - R_h}{i * p_r + L}\right)$$

wherein, arccos is an inverse cosine function, $R_H$ is the height of the satellite from the center of the earth, $R_h$ is the height of the satellite from the bottom of the slope body, $P_r$ is a slant range resolution, L is an incident slant range, and * is a multiplication sign.

4. The method according to claim 1, wherein the determining geometric distortions of the slope bodies under ascending orbit and under descending orbit respectively in step 3 comprises:

S3-1: determining whether the local incident angle is less than 0 degree; if the local incident angle is less than 0 degree, determining the slope body to be a slope body with the geometric distortions of layover, and ending the determining geometric distortions; otherwise, proceeding to step S3-2;

S3-2: determining whether the local incident angle is greater than or equal to 0 degree and less than or equal to 90 degrees; if the local incident angle is determined to be greater than or equal to 0 degree and less than or equal to 90 degrees, proceeding to step 3-3; if the local incident angle is not greater than or equal to 0 degree or not less than or equal to 90 degrees, determining the slope body to be a slope body with the geometric distortions of shadow, and ending the process of determining geometric distortions; and S3-3: determining whether the local incident angle is less than the satellite incident angle; if the local incident angle is less than the satellite incident angle, determining the slope body to be a slope body with a foreshortening; if the local incident angle is not less than the satellite incident angle, determining the slope body to be a suitable slope body.

* * * * *